United States Patent [19]

Kageyama et al.

[11] Patent Number: 5,335,095
[45] Date of Patent: Aug. 2, 1994

[54] IMAGE FORMING APPARATUS CAPABLE OF EDITING COLOR IMAGE

[75] Inventors: Hitoshi Kageyama; Osamu Yamada; Shinichi Mori, all of Osaka, Japan

[73] Assignee: Minolta Camera Kabushiki Kaisha, Osaka, Japan

[21] Appl. No.: 886,303

[22] Filed: May 21, 1992

Related U.S. Application Data

[63] Continuation of Ser. No. 593,292, Oct. 4, 1990, which is a continuation of Ser. No. 283,200, Dec. 12, 1988, abandoned.

[30] Foreign Application Priority Data

Dec. 16, 1987 [JP] Japan .................................. 62-319526

[51] Int. Cl.⁵ .............................................. H04N 1/46
[52] U.S. Cl. ...................................... 358/500; 358/537; 358/538; 358/453
[58] Field of Search .................... 358/75, 76, 80, 452, 358/453, 475, 478, 484, 401, 400, 500, 520, 531, 537, 538; H04N 1/46

[56] References Cited

U.S. PATENT DOCUMENTS

| | | | |
|---|---|---|---|
| 3,848,856 | 11/1974 | Reeber | 358/76 |
| 4,275,958 | 6/1981 | Tachika et al. | 355/14 R |
| 4,393,398 | 7/1983 | Horiguchi et al. | 358/80 |
| 4,414,636 | 11/1983 | Ueda et al. | 358/80 |
| 4,467,364 | 8/1984 | Konagaya | 358/80 |
| 4,674,861 | 6/1987 | Kawamura | 355/4 |
| 4,689,666 | 8/1987 | Hatanaka | 358/75 |
| 4,717,954 | 1/1988 | Fujita et al. | 358/75 |
| 4,748,680 | 5/1988 | Margolin | 358/75 |
| 4,819,193 | 4/1989 | Imao | 358/80 |
| 4,833,532 | 5/1989 | Abe | 358/80 |
| 4,839,722 | 10/1987 | Barry et al. | 358/80 |
| 4,873,570 | 10/1989 | Suzuki et al. | 358/75 |
| 4,958,217 | 9/1990 | Kimura et al. | 358/75 |

FOREIGN PATENT DOCUMENTS 0290976 11/1988 European Pat. Off. ........ H04N 1/40
60-239764 11/1985 Japan ........................... G03G 15/00

Primary Examiner—Mark R. Powell
Assistant Examiner—Jerome Giant, II
Attorney, Agent, or Firm—Price, Gess & Ubell

[57] ABSTRACT

An apparatus for editing color image capable, by having a desired color in an original designated and an editing mode selected, of image editing for an image in the designated color in such an editing mode as trimming, masking, erasing, and conversion to another color. A desired color in an original image is designated by a designated color input portion and thereby designated color data for separated colors are obtained. Thereafter, the original image is scanned and image data for separated colors are obtained. The thus input image data are electrically edited in the selected edit mode based on the designated color data and the edited image data are output to an image forming unit and thereby an edited color image is obtained.

10 Claims, 3 Drawing Sheets

IMAGE FORMING APPARATUS CAPABLE OF EDITING COLOR IMAGE

This is a continuation of application Ser. No. 07/593,292, filed on Oct. 4, 1990 which is a continuation of application Ser. No. 283,200, filed on Dec. 12, 1988, now abandoned, for an IMAGE FORMING APPARATUS CAPABLE OF EDITING COLOR IMAGE.

BACKGROUND OF THE INVENTION

The present invention relates to an image forming apparatus capable of editing a color image based on a designated color in a polychromatic original image.

There has been known a copying machine capable of editing a picture image by trimming or masking a specific area of an original image or moving it to another position. A copying machine, disclosed for example in Japanese Laid-open Patent Publication No. 60-239764, is also known which includes a plurality of developing devices and produces a copy of a specific area of an original image in a designated color using the developing device for that color.

These copying machines are all of the type in which a specific area of an original image is designated and image editing is performed for that specific area, but none of these prior art copying machines is able to have a specific color designated and perform image editing corresponding to that designated color.

More particularly, these copying machines are unable to perform such operations as to erase part of an original image in a specific color, to erase other parts of the image than that in a specific color, or to convert part of the image in a specific color into that in another color.

With a digital copying machine, such operations are performed as to electrically read a color image of an original by means of an image reader formed of a scanner and the like, with the image separated into those of three colors, red (R), green (G), and blue (B), to convert the obtained image data into image signals for each of three developing colors, for example cyan, magenta, and yellow, to form images according to the image signals for each of these colors, and to combine these images to obtain a color image.

When performing color image editing with such a digital copying machine, a means becomes necessary which will specify a desired color for performing the image editing of the image data read out by the image reader. As means for specifying the color, such a means can be considered which will specify values of density for each of the developing colors, cyan, magenta, and yellow, but there is a problem that specifying colors by numerical values is not a simple matter and also is liable to cause an error in the specified color.

SUMMARY OF THE INVENTION

A primary object of the present invention is to provide an image forming apparatus capable of editing image based on a designated color in an original image.

Another object of the present invention is to provide an image forming apparatus capable of editing a color image, in performing image editing based on a color in an original image, and of executing designation of the color for the image editing by reading the desired color directly from an original image.

The above and other objects and features of the invention will appear more fully hereinafter from a consideration of the following description taken in connection with the accompanying drawing wherein one embodiment is illustrated by way of example.

DETAILED DESCRIPTION OF THE PREFERRED EMBODIMENTS

An embodiment of the present invention will be described below with reference to the accompanying drawings.

Figure 1:
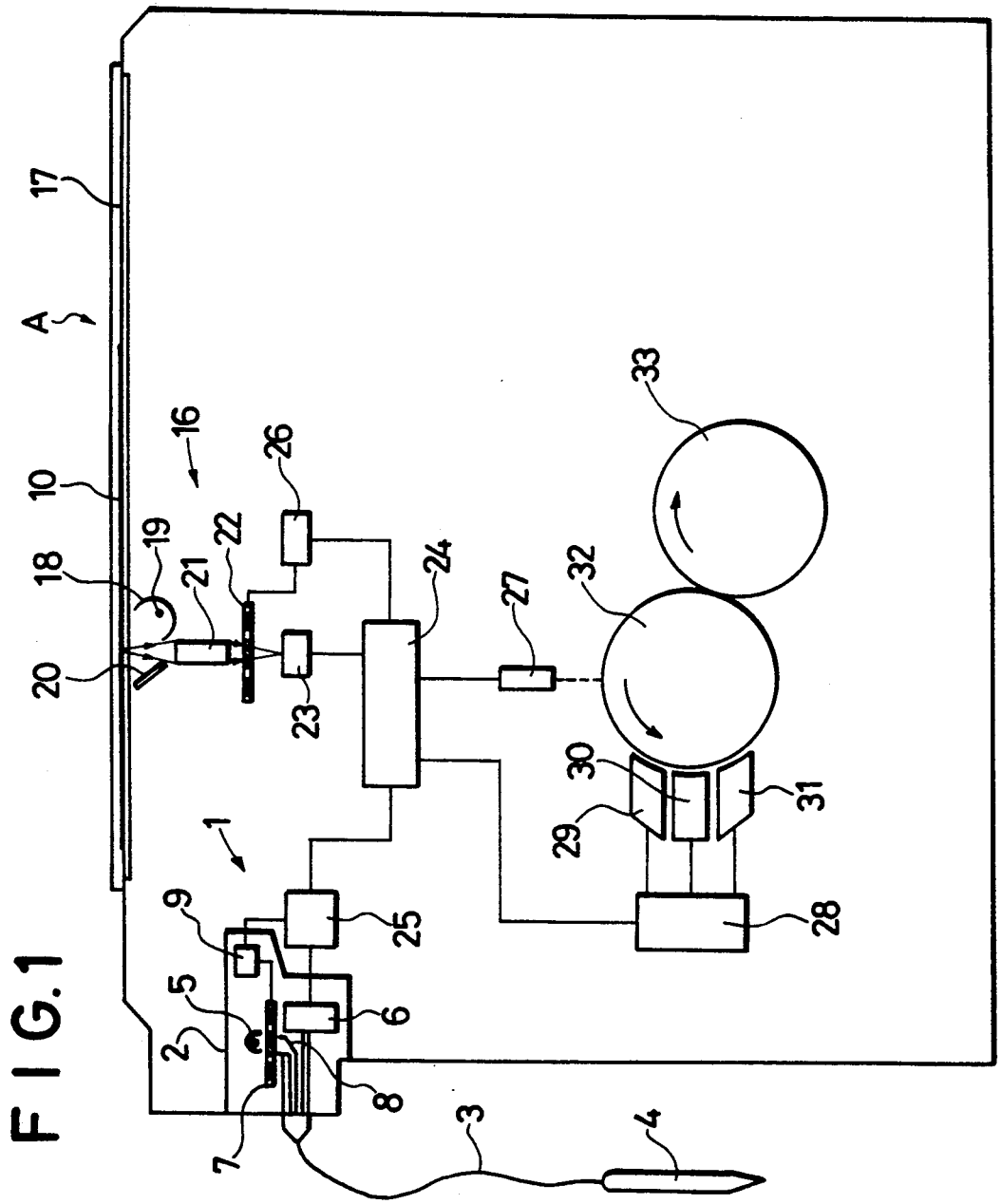
FIG. 1 is a block diagram showing structure of a copying machine having an apparatus for editing color image according to the present invention.

FIG. 1 is a block diagram showing a digital copying machine having an apparatus for editing a color image according to the present invention.

Referring to the figure, there is provided in a copying machine A a color reading unit 1 composed of light emitting/receiving portion 2, a designated color input portion 4, an optical cable 3, and a color memory 25.

The light emitting/receiving portion 2 is composed of a light source 5, an optical filter 7 for color separation into three colors, B (blue), G (green), and R (red), a mirror 8 for reflecting light from the light source 5 to have it thrown into the optical cable 3, a filter control portion 9 for controlling movement of the optical filter 7, and a photosensor device 6 formed of a CCD.

Figure 2:
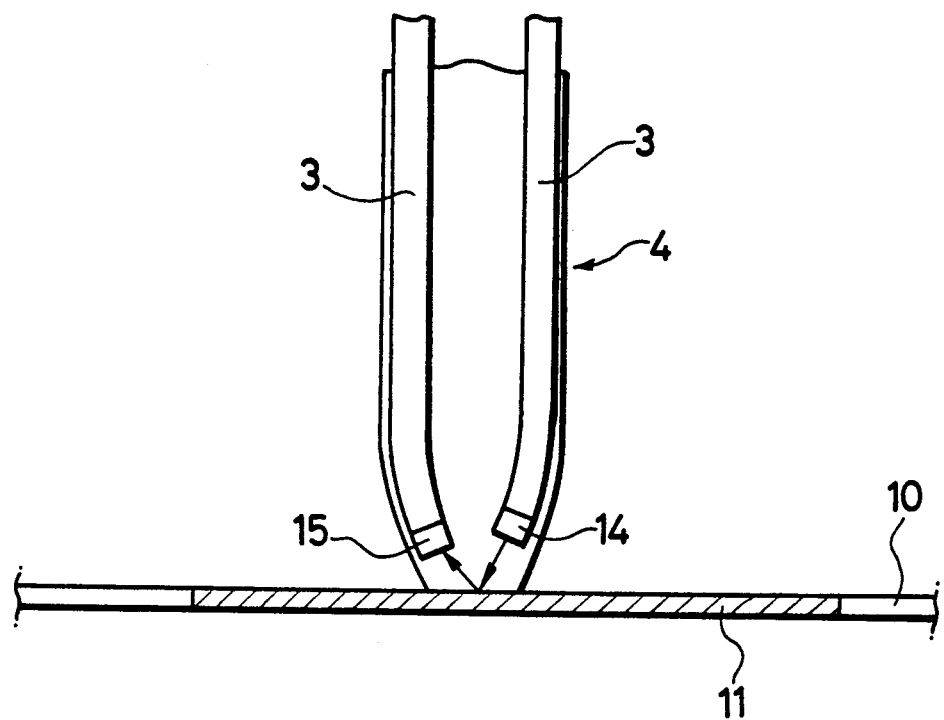
FIG. 2 is an enlarged sectional view of a designated color input portion.

The light from the light source 5 is filtered by the optical filter 7 and transmitted through the optical cable 3 to the designated color input portion 4, and as is made apparent by referring to FIG. 2, the light is thrown from a light transmitting portion 14 within the designated color input portion 4 on an image 11 in a designated color of an original 10 or the like. The light thrown on the image 11 is reflected thereby and received by a light receiving portion 15 within the designated color input portion 4 and introduced, again through the optical cable 3, into the photosensor device 6 in the light emitting/receiving portion 2.

The color of the optical filter 7 is sequentially changed to B, G, and R by means of the filter control portion 9, whereby the light from the light source 5 is reflected by the image 11 for each of the three primary colors and received by the photosensor device 6 as described above. The light of each of the colors B, G, and R received by the photosensor device 6 will have relative intensity characteristic of the color of the image 11, and hence, the colors are each converted into electric signals in accordance with the relative intensity, and this data is stored in the read color memory 25 as color information for the designated color.

Referring to FIG. 1, the copying machine A is provided with an image reader portion 16 for reading a color image of an original 10 mounted on an original platen glass 17.

The image reader portion 16 is composed of a main reflecting mirror 18, a light source 19, a subreflecting mirror 20, a lens 21, an optical filter 22, a linear image sensor 23, a filter control portion 26, and so on. Optical scanning of the original 10 mounted on the original platen glass 17 is made possible by the movement of the original platen glass 17 or the image reader portion 16.

The image reader portion 16 makes three scans by sequentially changing the optical filter 22 to colors B, G, and R and reads the image of the original 10. More particularly, light from the light source 19 is reflected by the original 10, and the reflected light is passed through the lens 21 and the optical filter 22 and introduced into the linear image sensor 23. The linear image sensor 23 converts the reflected light from the original image into electrical signals for each of the colors corresponding to the respective intensity and stores the data as original image data in a memory within a signal conversion unit 24. The signal conversion unit 24 carries out an editing operation on the original image data according to the color information read out by the color reading unit 1 as described above.

The copying machine A is further provided with an image write head 27 formed of an LED array or the like, developing devices 29, 30, and 31 for each color of cyan, magenta, and yellow, a developing device control unit 28, a photosensitive member 32, a transfer drum 33 around which copying paper has been wound, and so on.

Operation of the copying machine A constructed as above will be described below.

Figure 4:
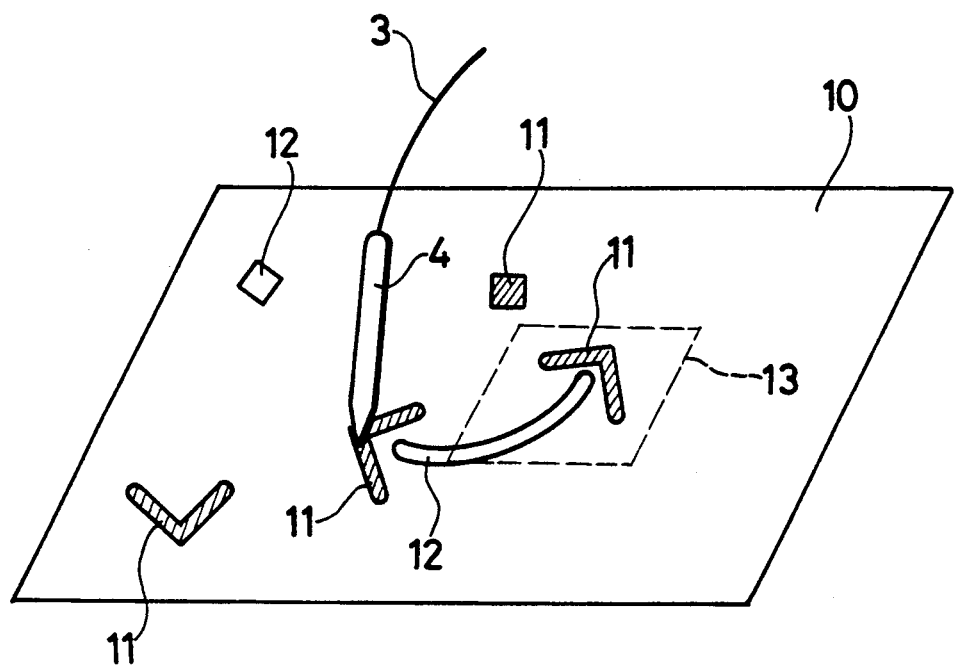
FIG. 4 and FIG. 5 are drawings showing examples of original documents.

FIG. 4 shows an example of the original 10. In this original 10, there are drawn images 11, 11, ... in the same color and images 12, 12, ... in a different color from the color of the image 11. An edit process to erase the image 11 from the image in the original 10 will be described now.

First, the tip of the designated color input portion 4 is put on the image 11 in the original 10 and the color of the image 11 is read by the color reading unit 1 and thereby color designation is carried out. The thus obtained color information about the designated color is stored in the color memory 25.

The original 10 is mounted on the original platen glass 17 and the entire image in the original 10 is read by the image reader portion 16. The read out original image data is stored in the memory within the signal conversion unit 24.

By operating a selector key or the like, a masking mode, in which images of the color designated by the color reading unit 1 are erased from the original image, is selected.

The signal conversion unit 24 performs data processing to convert part of the original image data read out by the image reader portion 16 being in the same color as read and designated by the color reading unit 1 into a white image, and outputs the data as the result of the conversion to the image write head 27 and the developing device control unit 28.

The image write head 27 causes the photosensitive member 32 to be exposed according to the image data from the signal conversion unit 24, and an electrostatic latent image thus formed thereon is developed by one of the developing devices 29, 30, 31 controlled by the developing device control unit 28 and then transferred to the copying paper wound around the transfer drum 33. Such a process is repeated three times, i.e., one time for each color of the developing devices 29, 30, 31, and thereby, three color images are combined on the copying paper and a polychromatic image is formed.

Through the described process, an image of the original 10, less the image 11 is obtained.

It has been practiced in the prior art method to designate for example an area 13 so that the designated area 13 may be erased. It has therefore been necessary to designate such an area for each of the images 11. In addition thereto, where there was another image 12 very close to one of the images 11, even the image 12 which was unnecessary to erase was sometimes erased.

According to the above described embodiment, by designating the color to be erased only once, all of the images 11 in the same color, and the images 11 only, can be easily erased from the image of the original 10. Further, the designation of the color is easily done just by putting the designated color input portion 4 on the image in the color to be designated and no mistake is made in a designated color.

Among the image edit modes performed by the signal conversion unit 24, there are, in addition to the above described masking mode, a trimming mode in which images in other colors than the color designated by the color reading unit 1 are converted into white images (i.e., only the images in the designated color are left as they are), a first color-conversion mode in which images in the color designated by the color reading unit 1 are converted into images in another color designated by the color reading unit 1, a second color-conversion mode in which images in other colors than that designated by the color reading unit 1 are converted into images in another color designated by the color reading unit 1, and so on.

Figure 5:
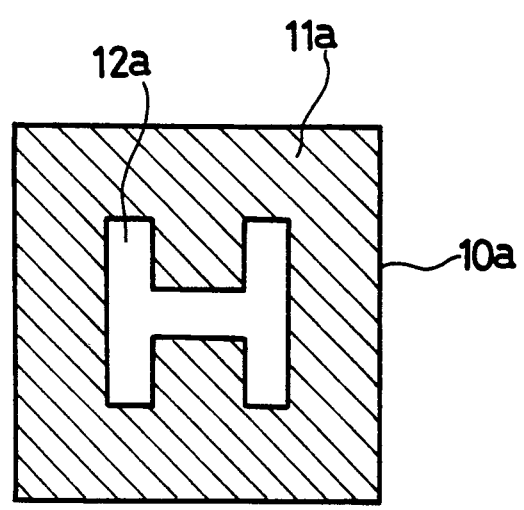

FIG. 5 shows an original 10a in which an image 12a of a character "H" is drawn in a color b on an image 11a of a background in a color a.

In order to convert the image 12a in the original 10a into that in a color c, the above mentioned first color-conversion mode is selected and then the designated color input portion 4 is put on the image 12a so that the color b is input. Thereafter, the color c is input from a suitable other color original in the color c. After the original 10a has been mounted on the original glass 17, the image processing operation as described above is performed. Thereby, the color of the image 12a can be easily converted to the color c.

Figure 3:
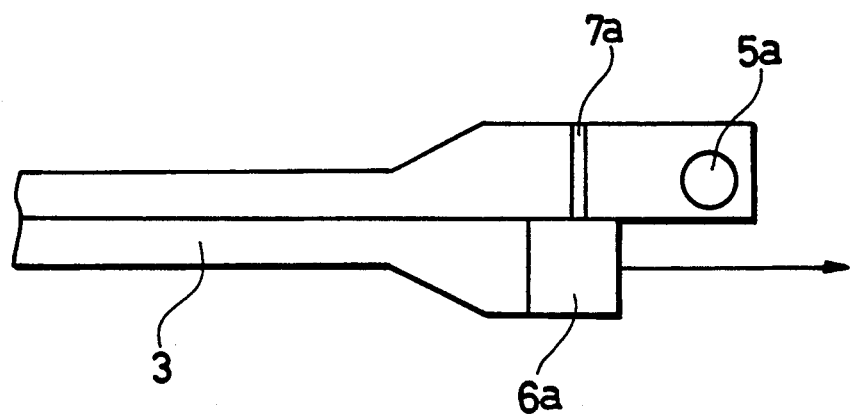
FIG. 3 is a sectional view showing another embodiment of a light emitting/receiving portion.

FIG. 3 is a drawing showing another embodiment of the end portion of the optical cable 3 within the light emitting/receiving portion 2.

In this embodiment, the light source 5a is disposed in alignment with the optical cable 3 and the optical filter 7a is interposed between the light source 5a and the optical cable 3. In this way, the optical filter 7 or 7a can be disposed at any position in the optical path from the light source 5 or 5a to the photosensor device 6.

When reading a color with the color reading unit 1 or when reading an image of an original 10 with the image reader portion 16 in the above described embodiment, the order of optical filter B, G, and R may be selected optionally. The order of image formation by the developing devices 29, 30, and 31 may also be selected optionally. Other combination of colors can also be used instead of these B, G, and R, or cyan, magenta, and yellow.

In the above embodiment, it is practicable to make the designation of area also possible in addition to the designation of color. By so doing, designation of images can be performed more finely and editing in a wider variety can be carried out easily.

In the above embodiment, an example of its application to a copying machine A has been described, but the same can be applied to other image forming apparatus than copying machines.

According to the present invention, the designation of color can be performed easily and free from error and editing based on the designated color can be carried out smoothly.

Having described our invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. An image forming apparatus capable of editing a photocopied color image comprising:
    image reading means for scanning an original image to optically read the image and outputting original image data;
    color designating means for directly sensing a desired color in an original image without aid of an intermediate display monitor, said color designating means having color reading means for optically reading a color of an image to generate color data, and storing means for storing the color data;
    editing means for electrically editing corresponding color areas within the original image data based on the designated desired color stored as color data in said storing means to generate edited image data for forming a photocopy; and
    image forming means for forming a photocopied image on copying paper based on the edited image data output from said editing means thereby to form a photocopied image edited based on the designated desired color sensed by said color designating means.

2. An image forming apparatus capable of editing a photocopied color image according to claim 1, wherein said color reading means includes:
    a light source;
    a first optical fiber for transmitting light emitted by said light source from the body of said apparatus for editing color image;
    an irradiating portion for throwing the light transmitted through said first optical fiber on an image;
    a light receiving portion for receiving the light thrown from said irradiating portion and reflected by the image;
    a second optical fiber for transmitting the light received by said light receiving portion to the apparatus for editing color image; and
    a photosensor device for converting the light transmitted through said second optical fiber into an electric signal.

3. The image forming apparatus of claim 1, wherein the color designating means is an optical pen.

4. An image forming apparatus capable of editing a photocopied color image of an original document comprising:
    image reading means for reading an image of the original document to output image data;
    color designating means for directly sensing a desired color without aid of an intermediate display monitor, said color designating means having color reading means for optically reading a color of an image to generate color data;
    editing means for editing the image data based on the color data representation of the desired color to produce edited image data; and
    image forming means for reproducing the edited image data as a photocopy.

5. An image forming apparatus capable of editing a photocopied color image according to claim 3, wherein said color reading means includes:
    a light source;
    a first optical fiber for transmitting light emitted by said light source from the body of said apparatus for editing color image;
    an irradiating portion for throwing the light transmitted through said first optical fiber on an image;
    a light receiving portion for receiving the light thrown from said irradiating portion and reflected by the image;
    a second optical fiber for transmitting the light received by said light receiving portion to the apparatus for editing color image; and
    a photosensor device for converting the light transmitted through said second optical fiber into an electric signal.

6. The image forming apparatus of claim 4, wherein the color designating means is an optical pen.

7. An improved copier having an editing capability comprising:
    color designating means for directly sensing a desired color of indicia on a multicolor original without aid of an intermediate display monitor and providing a corresponding color of indicia signal;
    means for storing that color of indicia signal;
    means for electro-optically converting the original image into a representative set of electrical signals including signals of the color content of the image;
    editing means responsive to the stored color of indicia signal for altering the set of electrical signals by removing the corresponding electrical signals by the same color content of the image corresponding to the color of indicia signal; and
    means for forming an image of the original, as modified by the editing means, in response to the altered set of electrical signals.

8. An improved copier having an editing capability comprising:
    means for sensing a particular color of indicia on an original and providing a corresponding color signal;
    means for storing that color signal;
    means for electro-optically converting the image of the original into a representative set of electrical signals including signals of the color content of the original image;
    editing means responsive to the stored color signal representative of the color of indicia for altering the set of electrical signals including masking control means for removing the corresponding color signal representative of the color of indicia from the image, trimming control means for removing from the image all color signals other than the corresponding color signal representative of the color of indicia, and color conversion control means for providing an alternative color signal to the image to replace the corresponding color signal representative of the color of indicia, and
    means for forming a final image of the original image, as modified by the editing means, in response to the altered set of electrical signals, including an image write head, a photosensitive member exposed by the image write head in accordance with the altered set of electrical signals, a plurality of color toner developing devices, and a source of copy paper to receive the toner image from the photosensitive member.

9. The improved copier of claim 8 wherein the means for sensing a color of indicia includes:
   a light source;
   a first optical fiber for transmitting light emitted by said light source;
   an irradiating portion for throwing the light transmitted through said first optical fiber on an image;
   a light receiving portion for receiving the light thrown from said irradiating portion and reflected by the image;
   a second optical fiber for transmitting the light received by said light receiving portion, and
   a photosensor device for converting the light transmitted through said second optical fiber into an electric signal.

10. A method of editing a color image of a multicolored original comprising the steps of:
   optically reading an image of the original and generating first electrical signal data corresponding to an optical image of the original, said first electrical signal data including color data;
   storing the first electrical signal data;
   designating a reference color by optically reading a reference color information directly and without aid of an intermediate display monitor and generating second electrical signal data corresponding to the reference color information;
   editing the first electrical signal data corresponding to a color which is the same color as the color corresponding to the second electrical signal data; and
   visualizing the first electrical signal, as edited, on an image retentive member.

* * * * *